United States Patent
Chen et al.

(10) Patent No.: US 9,222,315 B2
(45) Date of Patent: Dec. 29, 2015

(54) ROTARY LOCK BLOCK TYPE DRILLING RISER CONNECTOR

(75) Inventors: Caihu Chen, Shaanxi (CN); Dingya Wang, Shaanxi (CN); Keren Ren, Shaanxi (CN); Ping Deng, Shaanxi (CN); Jinquan Wang, Shaanxi (CN); Aili Li, Shaanxi (CN); Hong He, Shaanxi (CN)

(73) Assignee: Baoji Oilfield Machinery Co., Ltd., Shaanxi (CN)

( * ) Notice: Subject to any disclaimer, the term of this patent is extended or adjusted under 35 U.S.C. 154(b) by 252 days.

(21) Appl. No.: 13/985,804

(22) PCT Filed: Jun. 7, 2011

(86) PCT No.: PCT/CN2011/075363
§ 371 (c)(1),
(2), (4) Date: Sep. 23, 2013

(87) PCT Pub. No.: WO2012/109829
PCT Pub. Date: Aug. 23, 2012

(65) Prior Publication Data
US 2014/0020905 A1   Jan. 23, 2014

(30) Foreign Application Priority Data
Feb. 15, 2011   (CN) .......................... 2011 1 0038537

(51) Int. Cl.
*E21B 17/08*   (2006.01)
*F16L 23/024*   (2006.01)

(52) U.S. Cl.
CPC ............. *E21B 17/085* (2013.01); *F16L 23/024* (2013.01)

(58) Field of Classification Search
CPC .............................. E21B 17/085; F16L 23/024
USPC .......................................... 166/344, 348, 349
See application file for complete search history.

(56) References Cited

U.S. PATENT DOCUMENTS

| | | | | |
|---|---|---|---|---|
| 3,236,544 A | * | 2/1966 | Brown | 285/97 |
| 3,345,087 A | * | 10/1967 | Hanes et al. | 285/39 |
| 3,445,126 A | * | 5/1969 | Watkins | 285/85 |
| 4,424,988 A | * | 1/1984 | Cowx | 285/2 |
| 4,496,173 A | | 1/1985 | Roche et al. | |
| 4,900,071 A | | 2/1990 | Smith, III | |
| 5,992,893 A | * | 11/1999 | Watkins | 285/18 |
| 6,328,343 B1 | * | 12/2001 | Hosie et al. | 285/90 |

(Continued)

FOREIGN PATENT DOCUMENTS

| CN | 2632290 Y | 8/2004 |
|---|---|---|
| CN | 101086307 A | 12/2007 |
| CN | 201265365 Y | 7/2009 |
| CN | 201293161 Y | 8/2009 |

(Continued)

*Primary Examiner* — James G Sayre
(74) *Attorney, Agent, or Firm* — Dickstein Shapiro LLP

(57) ABSTRACT

A rotary lock block type drilling riser connector has a main body connection part and control pipeline connection parts. A driving ring is set between flanges, a plurality of fan-shaped grooves are set on the lower end of the flange of the upper joint, each fan-shaped groove having a lock block therein; each lock block is slidably connected with a T-shaped elongated slot of the upper joint; the driving ring is fixedly connected with the flange upwardly, many segments of the horizontal T-shaped slots are evenly distributed in the inner surface of the driving ring, another screw hole is provided in the outer circumferential surface of the lock block, and the driving ring is slidably connected with the lock block in the circumferential direction.

7 Claims, 10 Drawing Sheets

(56) References Cited

U.S. PATENT DOCUMENTS

| | | | |
|---|---|---|---|
| 7,686,087 B2* | 3/2010 | Pallini et al. | 166/367 |
| 8,312,933 B2* | 11/2012 | Larson et al. | 166/380 |
| 2005/0206163 A1* | 9/2005 | Guesnon et al. | 285/402 |

FOREIGN PATENT DOCUMENTS

| | | |
|---|---|---|
| CN | 201606014 U | 10/2010 |
| CN | 102146772 A | 8/2011 |
| EP | 0 373 250 A1 | 6/1990 |

* cited by examiner

ROTARY LOCK BLOCK TYPE DRILLING RISER CONNECTOR

TECHNICAL FIELD

The present disclosure belongs to the field of the offshore oil drilling and production equipment, relates to the connection device between individual drilling risers used in deep water environment, and particularly relates to a rotary lock block type drilling riser connector.

BACKGROUND ART

The offshore drilling riser connector, as an important connection means between the riser strings, have a plurality of functions including connecting the riser strings, supporting and fixing the auxiliary pipeline, installing the seabed drilling equipment, recycling the mud and isolating the seawater, etc. The structures adopted in the present riser connectors mainly include a screw structure, a flange-bolt structure and a pawl-lockblock structure, etc. The screw type connector is suitable for shallow water, while the flange-bolt connector is suitable for deep water, and is advantageous in its reliable connection and high bearing capacity. However, the assembly of said connector is time consuming, which lowers the working efficiency. Compared with the flange-bolt connector, the pawl-lockblock connector is advantageous in its fast connection speed, although one should still drive six bolts during connection operation, which is also rather complex.

DISCLOSURE OF THE PRESENT INVENTION

Technical Problems

The present disclosure provides a rotary lock block type drilling riser connector, which solves the problem of lacking in efficiency in installation caused by irrational structure.

Technical Solutions

The present disclosure adopts the following technical solution: a rotary lock block type drilling riser connector, including: a main body connection part and control pipeline connection parts, wherein, the structure of the main body connection part is: a driving ring is provided between the flanges of an upper and a lower joint; a plurality of fan-shaped grooves are provided evenly along a circumference of a lower end of the flange of the upper joint; each fan-shaped groove has a lock block therein; the driving ring surrounds outer sides of all the lock blocks; and matching crimping circular grooves are arranged in the outer circumference of each lock block and the lower joint;

a screw hole is provided in the center of an upper surface of each lock block; a T-shaped elongated slot facing downward is provided on top of each fan-shaped groove, and the screw hole of lock block is slidably connected with the T-shaped elongated slot of the upper joint in radial direction by a T-shaped screw;

the driving ring is fixedly connected with the flange upwardly; many segments of the horizontal T-shaped slots having the same structure are evenly distributed along a circumference of an inner surface of the driving ring, each T-shaped slot is a variable radius curve slot; a radial dimension from the bottom of each horizontal T-shaped slot to an axis of the lower joint is set to gradually increase from one end to the other; another screw hole is provided in the center of an outer circumferential surface of the lock block; and the driving ring is slidably connected with the lock block in a circumferential direction by a T-shaped screw.

In the rotary lock block drilling riser connector of the present disclosure, a main sealing is provided on a contact surface between an inner annular boss of the upper joint and a sealing boss of the lower joint.

A plurality of driving holes are evenly distributed in the outer circumferential surface of the driving ring; two positioning holes are provided on top of the driving ring at a circumferential interval of 30°; and the two positioning hole can be connected via positioning bolt after being aligned with a mounting hole on the upper joint.

An inner circumferential surface of the lock block is set to be a taper circular grooves to match with outer taper circular grooves on the circumference of the lower joint; the outer circumferential surface of the lock block is set to be a biasing centrifugal curved surface provided in collocation with the radial centrifugal curved surface of the inner surface of the driving ring.

The inner circumference of the lock block is set to be inner horizontal sawtooth circular grooves to match with outer horizontal sawtooth circular grooves on the circumference of the lower joint; the outer circumference of the lock block is set to be a circular surface provided in collocation with the a circular surface of the inner circumferential surface of the driving ring.

The difference in distances from the two ends of each T-shaped slot in the driving ring to the axis of the driving ring is larger than or equal to the radial movement distance of the lock block from the lower joint when changing from the disengaged status to the engaged status.

A through hole corresponding to at least one of the hydraulic pipeline, the kill pipeline, the mud pressurizing pipeline and the choke pipeline are provided in the flange of the upper joint and the flange of the lower joint.

There are two or more fan-shaped grooves on the upper joint, such as three, four, five, six, seven or eight fan-shaped grooves, and the number of the lock blocks correspond to the number of the fan-shaped grooves.

Advantageous Effects

The present disclosure is advantageous in the qualification in deep water and ultra deep water drilling operation in the ocean, which has features of the quick and convenient installation/disassembly and saving time and energy, and can be applied to connect the riser strings so as to provide a channel connected to seabed; also, said disclosure also have various purposes including seawater isolation, inner mud recycling, controlling pipelines fixation, lifting and installing of the BOP group on the offshore platform, and the driller navigation, etc. during the deep water drilling.

DETAILED DESCRIPTION OF EXEMPLARY EMBODIMENTS

Figure 1:
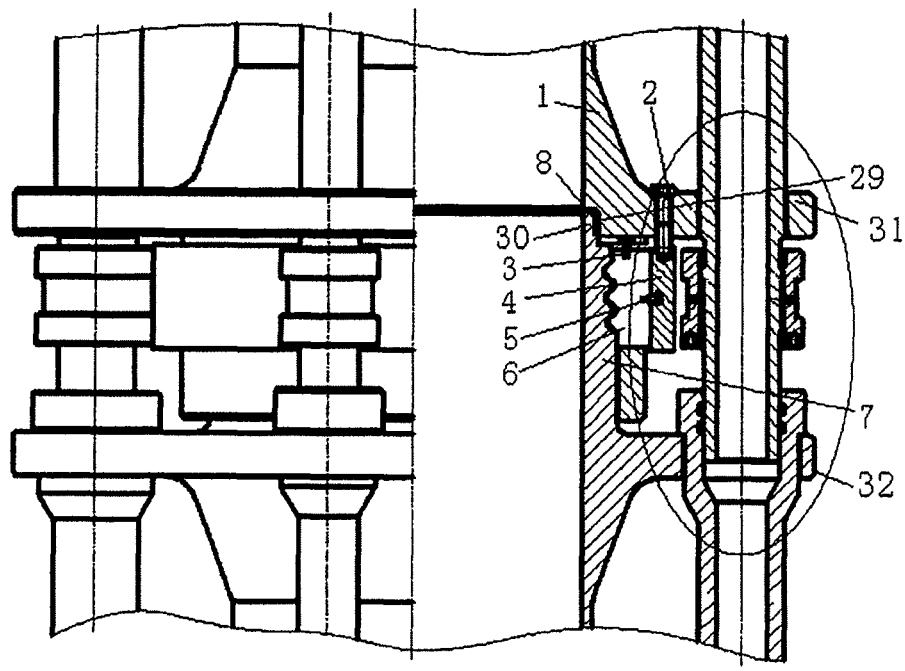
FIG. 1 is a half-section schematic view of embodiment 1 of the present disclosure.

The present disclosure will be described in detail in connection with the attached drawings and specific embodiments.

The rotary lock block drilling riser connector of the present disclosure, having a structure including a main body connection part and control pipeline connection parts, specifically includes two structure forms, the first being the rotary taper triangle circular groove type riser connector (refer to FIGS. 1 and 13-16), the second being the rotary direct-connecting sawtooth circular groove riser connector (refer to FIGS. 2 and 13-16); a through hole and a via hole 28 corresponding to at least one of the hydraulic pipeline 23, the kill pipeline 24, the mud pressurizing pipeline 25, the hydraulic pipeline 26 and the choke pipeline 27 are provided on the flange 31 of the upper joint 1 and the flange 32 of the lower joint 7.

As shown in FIGS. 1, 2 and 13-16, the structure of the main body connection part of the present disclosure is as follows: a driving ring 4 is provided between the flange 31 of the upper joint 1 and the flange 32 of the lower joint 7; six lock blocks 6 are provided along an inner circumference of the driving ring 4 and mounted respectively in the six evenly distributed fan-shaped grooves which are provided in the lower end of the flange 31 of the upper joint 1 along a circumferential direction; the top of each fan-shaped groove is provided with a radial T-shaped slot; and the matching crimping circular grooves are arranged in the outer circumferences of each lock block 6 and the lower joint 7.

An impermeable screw hole is provided in the center of the upper surface of each lock block, a T-shaped elongated slot facing downward is provided along the radial direction in the lower surface of the flange 31 of the upper joint 1, and the lock block 6 is slidably connected with the upper joint 1 in a radial direction by a T-shaped screw 3.

The driving ring 4 is fixedly connected with the flange 31 of the upper joint 1 upwardly through the positioning bolt 2; six segments of the horizontal T-shaped slots are evenly distributed in the inner surface of the driving ring 4 along a circumferential direction, each of the T-shaped slot being a curve slot having a variable radius; the radial dimension (variation in depth) from the bottom of each horizontal T-shaped slot to the axis of the lower joint 7 is set to gradually increase (or decrease) from one end to the other; another impermeable screw hole is provided in the center of the outer circumferential surface of the lock block 6; and the driving ring 4 is maintained to be slidably connected with the lock block 6 in a circumferential direction by a T-shaped screw 5.

A main sealing 8 is provided on the contact surface between the inner annular boss 29 of the upper joint 1 and the sealing boss 30 of the lower joint 7.

The flanges of the upper and lower joints can be flower-like, circular or square structure; the alignment of the flanges of the upper and lower joints can be achieved by aligning the positioning hole or positioning pin. Six driving holes are evenly distributed along the outer circumferential surface of the driving ring 4, for inserting the driving rod 22; two positioning holes are provided on top of the driving ring 4 at a circumferential interval of 30°; and the two positioning hole each can be connected with the mounting holes on the upper joint 1 via the positioning bolt 2 after being aligned with the holes.

Six (or two, three, four, five, seven, eight) evenly distributed fan-shaped grooves are arranged on the upper circumference of the upper joint 1, the top of each fan-shaped groove is formed with a T-shaped slot or dovetail slot, and the grooves are connected through the T-shaped or dovetail bolt. There may be two or more corresponding lock blocks, such as three, four, five, six, seven or eight lock blocks, which have outlines of the T-shaped slot or dovetail slot of the biased centrifugal curve, and curved surface.

Figure 3:
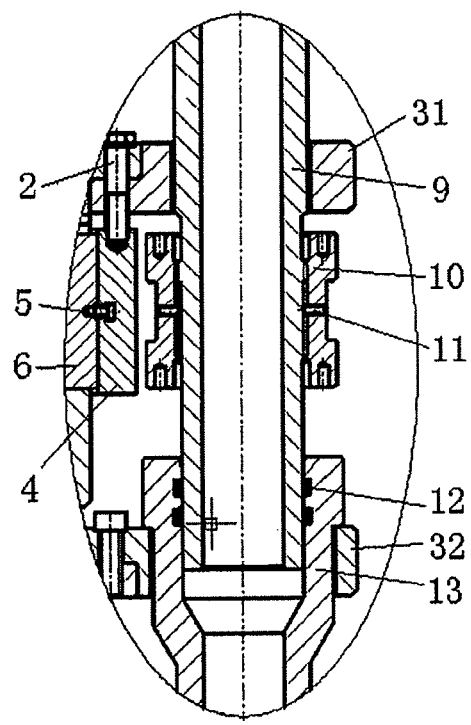
FIG. 3 is a schematic view illustrating the connection of the choke/kill pipeline joint of embodiment 1 of the present disclosure.
Figure 8:
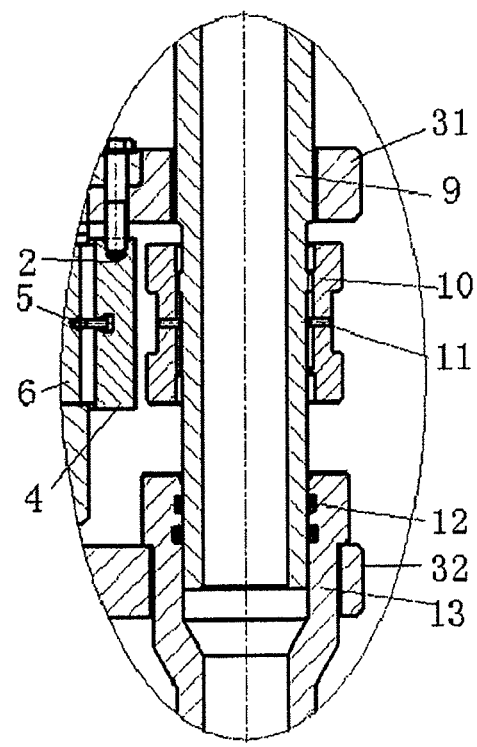
FIG. 8 is a schematic view illustrating the connection of the choke/kill pipeline joint of embodiment 2 of the present disclosure.

FIGS. 3 and 8 are schematic views illustrating the connection of the choke/kill pipeline joints in embodiments 1 and 2 of the present disclosure, wherein the choke/kill pipeline male joint 9 penetrates through the flange 31 of the upper joint 1 downward; the choke/kill pipeline female joint 13 penetrates through the flange 32 of the lower joint 7 upward; the choke/kill pipeline male joint 9 is inserted into the choke/kill pipeline female joint 13, the insertion part of which is provided with two layers of sealing 12; the insertion end of the choke/kill pipeline male joint 9 is also provided with a choke/kill pipeline adjusting nut 10 on which a positioning pin 11 is provided, so that the choke/kill pipeline adjusting nut 10 can be located at a proper position on the end of the choke/kill pipeline male joint 9.

Figure 4:
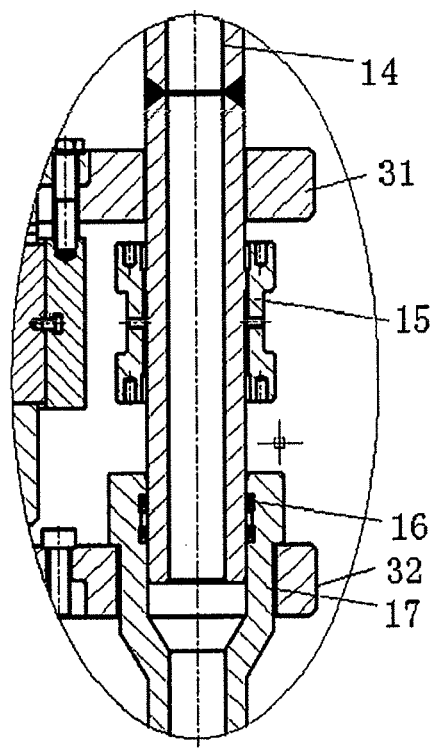
FIG. 4 is a schematic view illustrating the connection of the hydraulic pipeline joint of embodiment 1 of the present disclosure.
Figure 9:
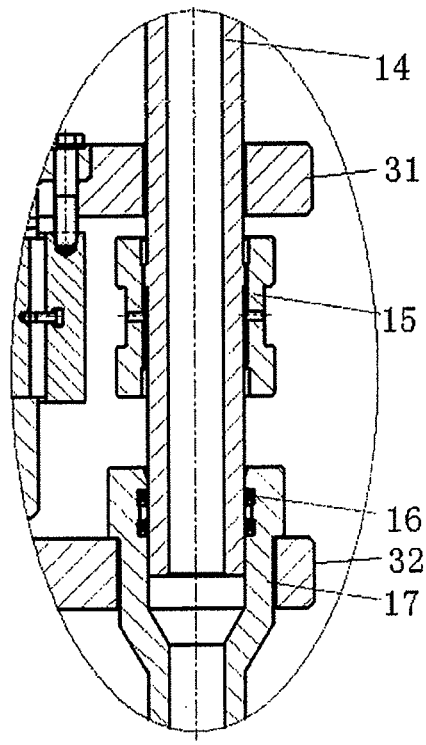
FIG. 9 is a schematic view illustrating the connection of the hydraulic pipeline joint of embodiment 2 of the present disclosure.

FIGS. 4 and 9 are schematic views illustrating the connection of the hydraulic pipeline joints in embodiments 1 and 2 of the present disclosure, wherein the hydraulic pipeline male joint 14 penetrates through the flange 31 of the upper joint 1 downward; the hydraulic pipeline female joint 17 penetrates through the flange 32 of the lower joint 7 upward; the hydraulic pipeline male joint 14 is inserted into the hydraulic pipeline female joint 17, the insertion part of which is provided with two layers of sealing 16; the insertion end of the hydraulic pipeline male joint 14 is also provided with a hydraulic pipeline positioning nut 15 on which a positioning pin is provided, so that the hydraulic pipeline positioning nut 15 can be located at a proper position on the end of the hydraulic pipeline male joint 14.

Figure 5:
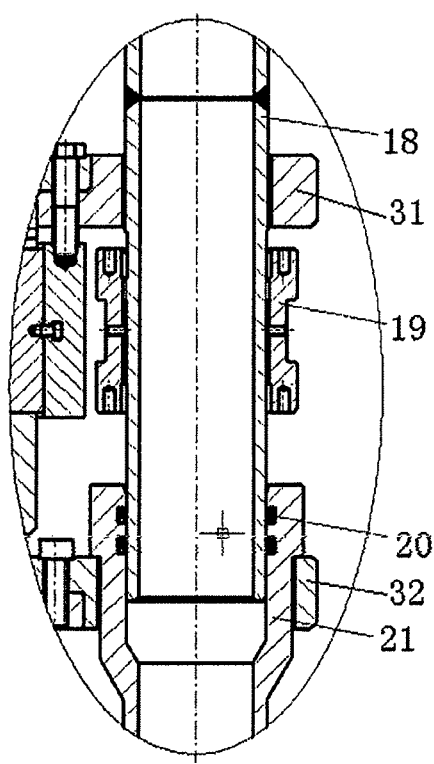
FIG. 5 is a schematic view illustrating the connection of the pressurizing pipeline joint of embodiment 1 of the present disclosure.
Figure 10:
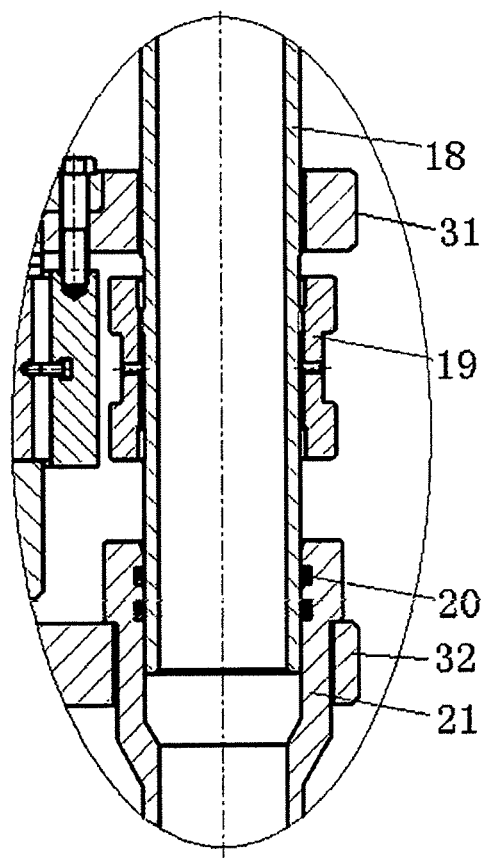
FIG. 10 is a schematic view illustrating the connection of the pressurizing pipeline joint of embodiment 2 of the present disclosure.

FIGS. 5 and 10 are schematic views illustrating the connection of the pressurizing pipeline joints in embodiments 1 and 2 of the present disclosure, wherein the pressurizing pipeline male joint 18 penetrates through the flange 31 of the upper joint 1 downward; the pressurizing pipeline female joint 21 penetrates through the flange 32 of the lower joint 7 upward; the pressurizing pipeline male joint 18 is inserted into the pressurizing pipeline female joint 21, the insertion part is provided with two layers of sealing 20; the insertion end of the present disclosure male joint 18 is also provided with a pressurizing pipeline positioning nut 19 on which a positioning pin is provided, so that the pressurizing pipeline positioning nut 19 can be located at a proper position on the end of the pressurizing pipeline male joint 18.

FIGS. 3, 4 and 5 show the local structure of the lock block 6 and the lower joint 7 disengaged from each other when the radial distance between the lock block 6 and the driving ring 4 reduces to the minimum.

FIGS. 8, 9 and 10 show the local structure of the lock block 6 and the lower joint 7 engaged with each other when the radial distance between the lock block 6 and the driving ring 4 increases to the maximum.

Figure 6:
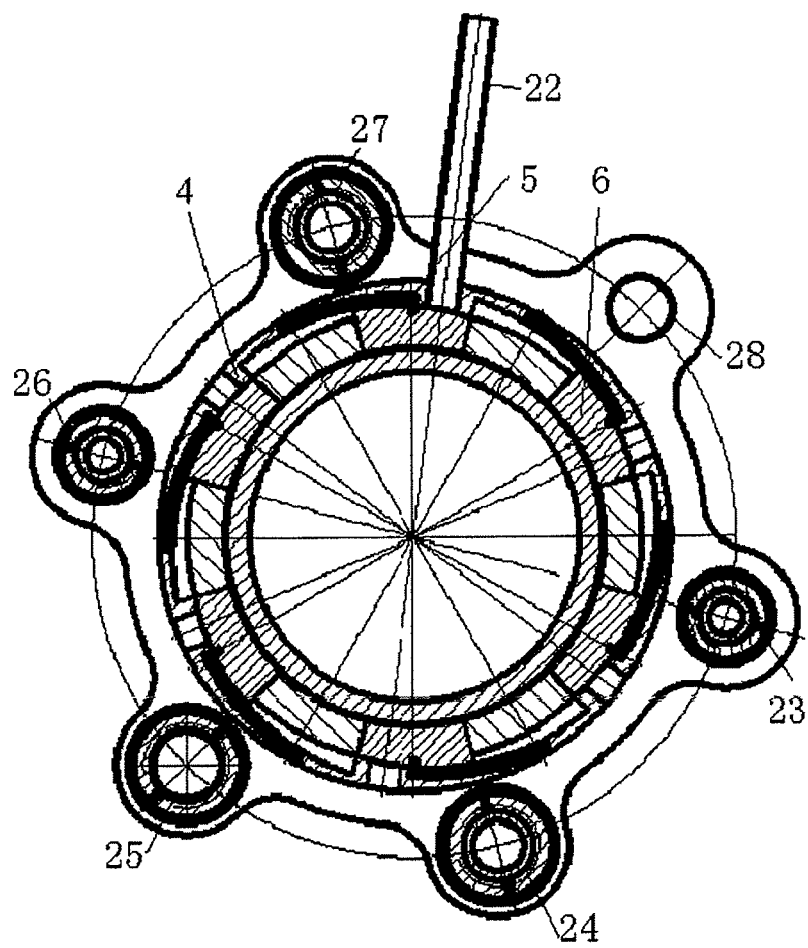
FIG. 6 is a cross section schematic view of embodiment 1 of the present disclosure when the connection is locked.
Figure 7:
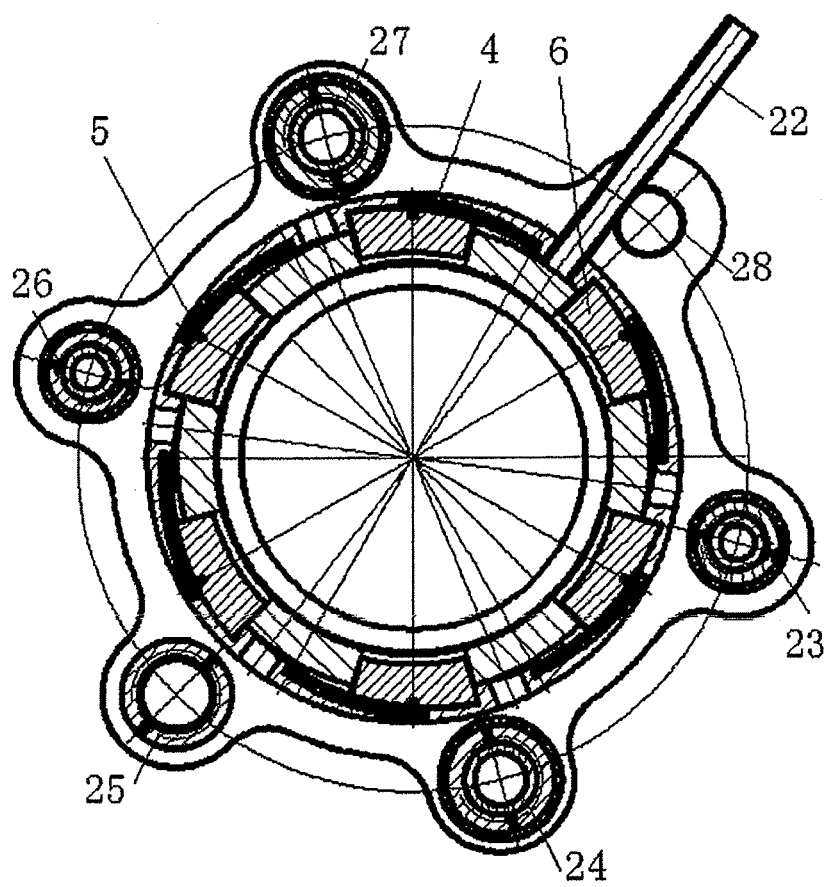
FIG. 7 is a section schematic view of embodiment 1 of the present disclosure when the connection is unlocked.

FIGS. 6 and 7 shows the disengagement status and the engagement status in embodiment 1, respectively; in embodiment 1, the inner circumferential surface of the lock block 6 is set as a taper circular groove matching with the outer taper circular groove on the circumference of the lower joint 7; the engagement teeth of the circular groove can be designed as a triangle, rectangle or circle, etc., and number of the teeth can be three, two or four, etc. The outer circumferential surface of the lock block 6 is set to be a biasing centrifugal curved surface provided in collocation with the radial centrifugal curved surface of the inner surface of the driving ring 4.

Figure 11:
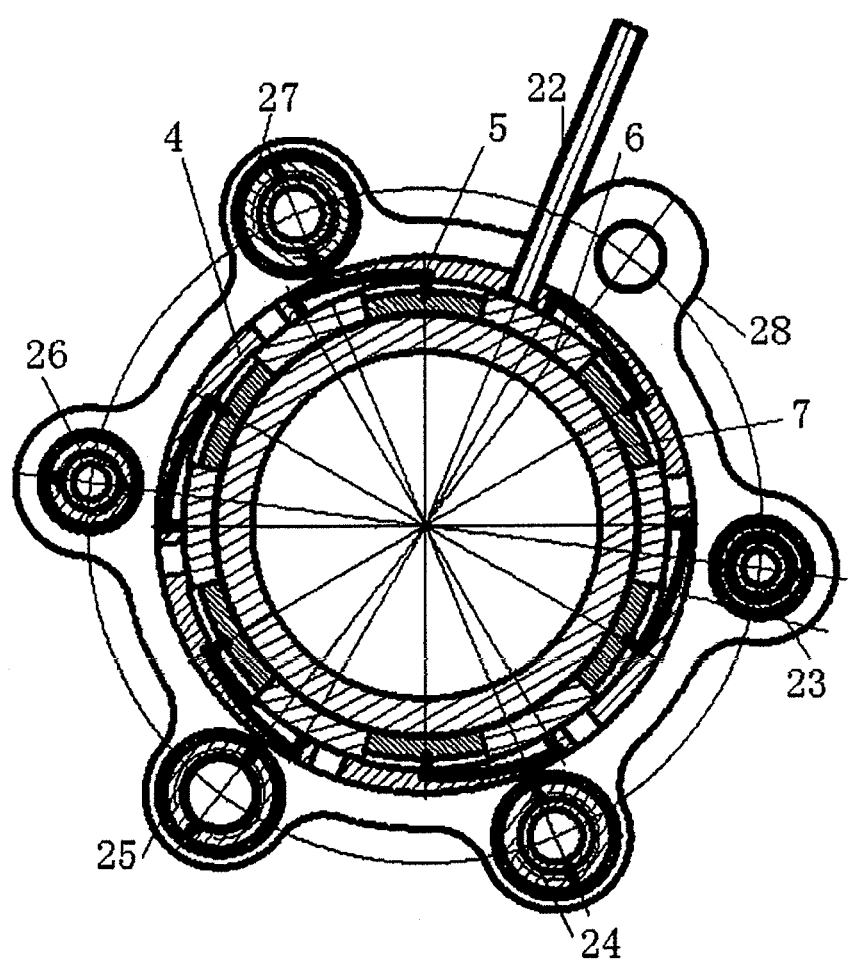
FIG. 11 is a section schematic view of embodiment 2 of the present disclosure when the connection is locked.
Figure 12:
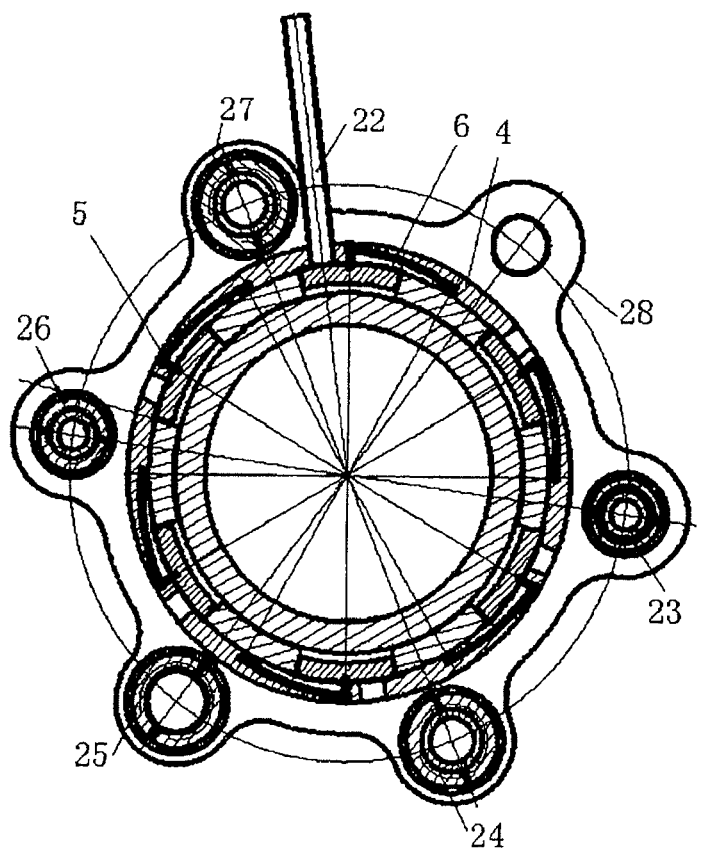
FIG. 12 is a section schematic view of embodiment 2 of the present disclosure when the connection is unlocked.
Figure 13:
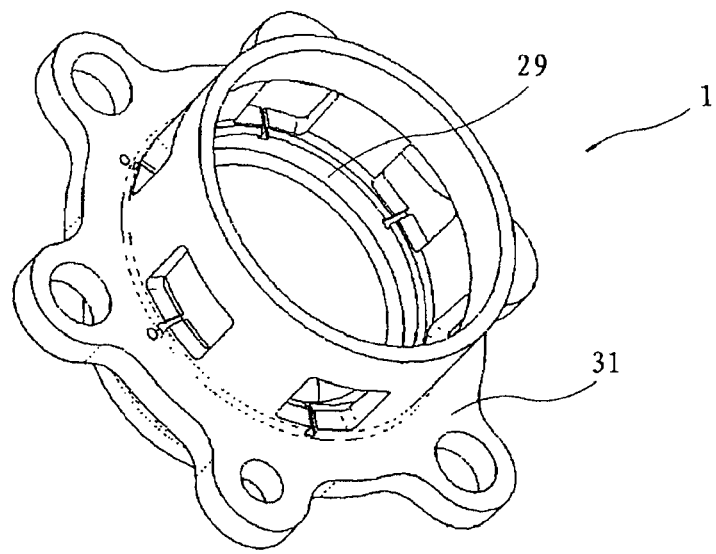
FIG. 13 is a 3D schematic view of the upper joint of embodiment 1 of the present disclosure.
Figure 14:
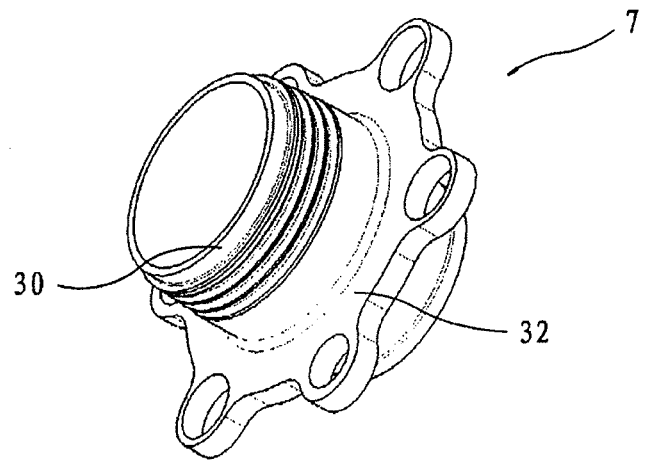
FIG. 14 is a 3D schematic view of the lower joint of embodiment 1 of the present disclosure.
Figure 15:
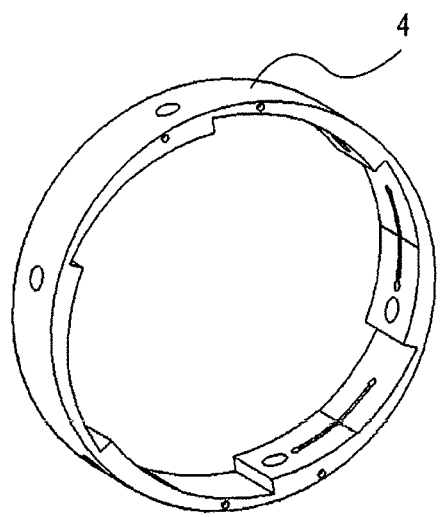
FIG. 15 is a 3D schematic view of the driving ring of embodiment 1 of the present disclosure.
Figure 16:
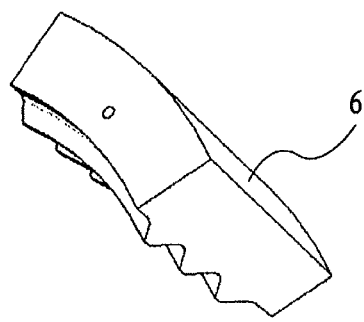
FIG. 16 is a schematic view of the lock block of embodiment 1 of the present disclosure, wherein: 1. upper joint; 2. positioning bolt; 3. T-shaped screw; 4. driving ring; 5. T-shaped screw; 6. lock block; 7. lower joint; 8. main sealing; 9. choke/kill pipeline male joint; 10. choke/kill pipeline adjusting nut; 11. positioning pin; 12. sealing; 13. choke/kill pipeline female joint; 14. hydraulic pipeline male joint; 15. hydraulic pipeline positioning nut; 16. sealing; 17. hydraulic pipeline female joint; 18. pressurizing pipeline male joint; 19. pressurizing pipeline positioning nut; 20. sealing; 21. pressurizing pipeline female joint; 22. driving rod; 23. hydraulic pipeline; 24. kill pipeline; 25. mud pressurizing pipeline; 26. hydraulic pipeline; 27. choke pipeline; 28. through hole; 29. inner annular boss; 30. sealing boss; 31. flange; 32. flange.

FIGS. 11 and 12 shows the disengagement and engagement status in embodiment 2; in embodiment 2, the inner circumference of the lock block 6 is set as an inner horizontal sawtooth circular groove matching with the outer horizontal sawtooth circular groove on the circumference of the lower joint 7; the outer circumference of the lock block 6 is set as a circular surface provided in collocation with a a circular surface of the inner surface of the driving ring 4. The engagement teeth of the circular groove can adopt a shape of 45° saw tooth, or 3°/30° saw tooth, rectangle, circle, etc., and the number of the teeth can be four, two, three or five.

The working principle of the present disclosure is: the top of the lock block 6 is connected with the T-shaped slot in the upper joint 1 through the T-shaped screw, so as to allow the radial centrifugal movement of the lock block 6 along the T-shaped slot in the upper joint 1; and the outer surface of the lock block 6 is connected with the T-shaped slot in the driving ring 4 through the T-shaped screw 5, so as to achieve the radial movement of the lock block 6 based on the variation in depth of the T-shaped slot while a circumferential displacement is generated between the lock block 6 and the driving ring 4.

The positioning bolt 2 is first released, so as to remove the bolt 2 from one positioning hole in the driving ring 4; the driving ring 4 is disengaged from the upper joint 1; the driving ring 4 is rotated clockwise by 30° using the driving rod 22, then the six T-shaped screws 5 move from the deeper end of the T-shaped curved slot of the driving ring 4 to the shallower end, so that the six lock blocks 6 may approach the axis, meanwhile, the six T-shaped screws 3 also restrict the six lock blocks 6 to achieve the radial slides to the axis along the T-shaped slot in the upper joint 1, until the inner circular groove of the six lock block 6 are completely engaged with the outer circular groove of the lower joint 7; tightening the positioning bolt 2 through another positioning hole on the driving ring 4, so as to fix and lock installation holes of the driving ring 4 and the upper joint 1, at the time the sealing end at an upper end of the lower joint 7 has been completely inserted into the sealing hole in the upper joint 1, so that the main sealing 8 isolates the seawater from the inside of the riser, that is, the connection between the upper joint 1 and the lower joint 7 is finished. Accordingly, the difference in distances from the two ends of each T-shaped slot in the driving ring 4 to the axis of the driving ring should be larger than or equal to the radial movement distance of the lock block from the lower joint when changing from the disengaged status to the engaged status.

When the main body connection part is well connected, the choke/kill pipeline male and female joints (9, 13), the hydraulic pipeline male and female joints (14,17) and the pressurizing pipeline male and female joints (18, 21) of control pipeline connection parts are also well inserted (as shown in FIGS. 3, 4, 5, 8, 9, 10); the sealing between the respective male and female joints isolate the pipelines from the outside, whereby the installation and connection of the individual riser are completely finished.

Figure 2:
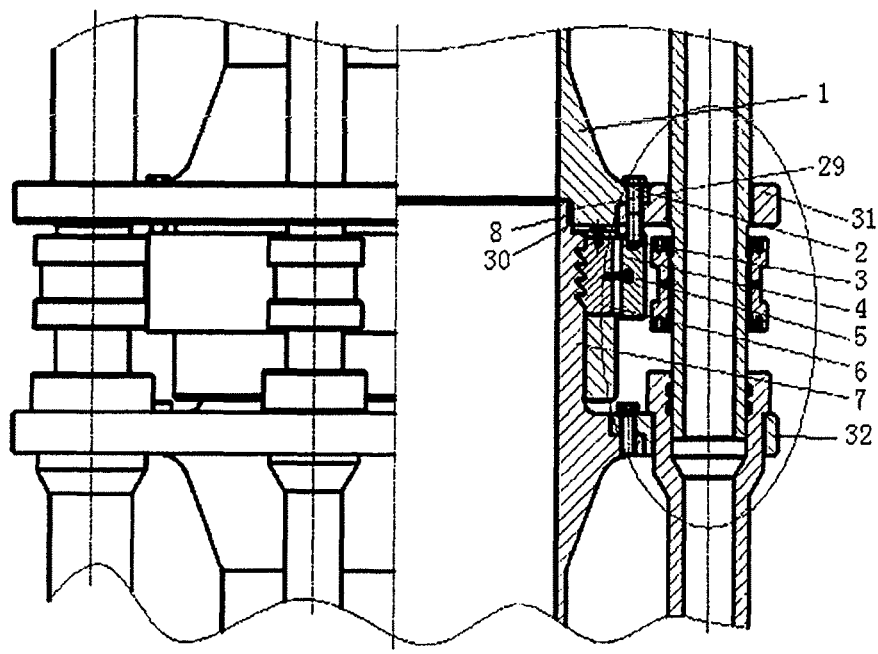
FIG. 2 is a half-section schematic view of embodiment 2 of the present disclosure.

FIG. 1 shows embodiment 1, and FIG. 2 shows embodiment 2 of the apparatus of the present disclosure; during the operation process, the lower joint 7 is fixed on the platform, then the upper joint 1 is lowered; after the upper joint 1 is inserted into the lower joint 7 and reaches the designated position, the male joints of each choke/kill pipeline, hydraulic pipeline and pressurizing pipeline are also inserted into the corresponding female joint (as shown in FIGS. 3, 4, 5, 8, 9, 10), at this time, the positioning bolt 2 is released, and the driving rod 22 is inserted into the driving hole on the circumference of the driving ring 4; the driving rod 22 rotates clockwise to drive the driving ring 4 connected with the upper joint 1, so as to bring the lock block 6 within the upper joint 1 to move radially along the circular groove and eventually clamp said lock block with the circular groove of the lower joint 7, at this time, the positioning bolt 2 is re-installed and locked, so as to achieve the purpose of connecting and fixing the upper joint and lower joint. During the detachment procedure, first, the positioning bolt 2 is released, the driving rod 22 is inserted into the driving hole on the circumference of the driving ring 4, and the driving ring 4 is rotated anticlockwise so as to bring the lock block 6 to be withdrawn to its initial position. In this scenario, the upper joint 1 is pulled up so that the upper joint 1 and the lower joint 7 can be disengaged; meanwhile, in order to maintain the lock block 6 in the initial status, the positioning bolt 2 should be tightened so as to fix the driving ring 4 and the lock block 6, and to ensure the storage of the upper joint 1 and the lower joint 7 along with the respective individual riser.

The apparatus of the present disclosure characterizes in that:

1) The driving ring 4 is rotated in a circumferential direction, and driving the six lock blocks 6 are driven to perform radial rotational movement by using the driving ring 4 so as to achieve the purpose of fixing the upper and lower joints; the mounting hole on the upper joint, the positioning hole on the driving ring 4 and the positioning bolt 2 cooperate with each other, so as to improve the reliability in tightening the upper and lower joints and increase the connection efficiency of the joints.

2) The driving ring 4 and the six lock blocks 6 are provided with six evenly distributed T-shaped slots with the outline of biasing centrifugal curve and curved surfaces, wherein an end of the curved surface of the T-shaped slot is near the axis, while the other end is far away from the axis. The driving ring is rotated clockwise by 30°, so that the six T-shaped curved slots on the driving ring 4 can move the six T-shaped screws 5 connected with the lock block 6 from one end of the T-shaped curved slot to the other end at the same time, so as to ensure that the six lock blocks 6 can be driven at the same time to perform radial movement when rotating the driving ring 4. In embodiment 1, the driving ring 4 and the six lock blocks 6 share the same form of curved surface, hence they may cooperate with each other so as to ensure that the curved surface of the driving ring 4 may bear radial pressure from the lock block 6 during the connection of the upper and lower joints, accordingly, the radial stress of the outer surface of the lock block 6 can be reduced, thereby increasing the security of connection and ensuring the synchronicity and accuracy of the radial movement of the six lock blocks 6. In embodiment 2, the inner circumferential surface of the driving ring 4 and the outer surface of the six lock blocks 6 are arc surface, which may lower the processing difficulty.

3) In embodiment 1, the inner circumferential surface of the lock block 6 and the connection part of the lower joint 7 are the taper circular groove structure, and the angle of the taper and the circular groove as a whole may increase the contact area when connecting the joints while maintaining the sizes to be unchanged, hence improving the overall connection capability of the joints. In embodiment 2, the inner circumferential surface of the lock block 6 and the connection part of the lower joint 7 are horizontal sawtooth circular groove structure, and the angle of the circular groove may ensure the lock block to have no lateral pressure when the joints are under connection stress, thus increasing the security of the joints during the operation.

4) The difference in distances from the inner and outer ends of each curved slot in the driving ring 4 to the axis of the driving ring 4 should be larger than the radial movement distance of the lock block 6 from the lower joint 7 when changing from the disengaged status to the engaged status, so as to ensure that the upper and lower joints can be smoothly engaged and disengaged.

5) The flanges of the upper and lower joints are set to be flower-like, so as to ensure the strength while reducing the weight of the entire joint. The flanges of the upper and lower joints are provided with mounting holes, so as to ensure the proper positioning of the joints of respective auxiliary pipelines during the installation of the flanges, and avoid shortcomings occurred when determining the alignment of the corresponding connection parts artificially.

6) The main sealing structure is adopted to directly provide the main sealing of the upper and lower joints on the upper and lower joints, saving a sealing sleeve used in a conventional structure, thus simplifying the structure and reducing the processing difficulty.

INDUSTRIAL APPLICATION

The apparatus of the present disclosure is advantageous in its simple structure, fast-to-connect, reliability, tensility, bending resistance as well as tightness, which is achieved by rotating the driving ring to drive the six lock blocks to be inserted into the outer circular groove of the male joint, which only requires the driving ring to be rotated by 30° with a relatively small rotation moment. The connector of the present disclosure is also advantageous in a large loading area, a high loading capacity, and a high pressure mud sealing adaptability of the lock block, which is completely competent in drilling operation in deep water and ultra deep water environment in the ocean.

The invention claimed is:

1. A rotary lock block type drilling riser connector, comprising a main body connection part and control pipeline connection parts,
    wherein the main body connection part includes an upper joint having a flange, a lower joint having a flange, a driving ring provided between the flange of the upper joint and the flange of the lower joint, and a plurality of lock blocks,
    wherein each of the lock blocks are respectively disposed in fan-shaped grooves provided evenly along circumference of a lower end of the upper joint, the driving ring surrounds outer sides of all the lock blocks, and matching crimping circular grooves are arranged in outer circumferences of each lock block and the lower joint;
    wherein a screw hole is provided in the center of an upper surface of each lock block, T-shaped elongated slots facing downward are provided, and the screw holes of the lock blocks are slidably connected with the T-shaped elongated slots in radial directions by T-shaped screws;
    wherein the driving ring is fixedly connected with the flange of the upper joint upwardly through a positioning bolt, segments of horizontal T-shaped slots are evenly distributed along a circumference of an inner surface of the driving ring, each horizontal T-shaped slot is a variable radius curve slot, a radial dimension from the bottom of each horizontal T-shaped slot to an axis of the lower joint is set to gradually increase from one end to the other, another screw hole is provided in the center of an outer circumferential surface of each lock block, and the driving ring is slidably connected with the lock blocks in a circumferential direction by T-shaped screws.

2. The rotary lock block type drilling riser connector of claim 1, wherein a main sealing is provided on a contact surface between an inner annular boss of the upper joint and a sealing boss of the lower joint.

3. The rotary lock block type drilling riser connector of claim 1, wherein a plurality of driving holes are evenly distributed in the outer circumferential surface of the driving ring; and two positioning holes are provided on top of the driving ring at a circumferential interval of 30°, and aligned with mounting holes on the upper joint for connection with positioning bolts.

4. The rotary lock block type drilling riser connector of claim 1, wherein an inner circumferential surface of each lock block includes taper circular grooves to match with outer taper circular grooves on the circumference of the lower joint; the outer circumferential surface of each lock block includes a biasing centrifugal curved surface provided in collocation with the radial centrifugal curved surface of the inner surface of the driving ring.

5. The rotary lock block type drilling riser connector of claim 1, wherein the inner circumference of the lock block includes inner horizontal sawtooth circular grooves to match with outer horizontal sawtooth circular grooves on the circumference of the lower joint; the outer circumference of each lock block includes a circular surface provided in collocation with a circular surface of the inner circumferential surface of the driving ring.

6. The rotary lock block type drilling riser connector of claim 1, wherein the difference in distances from the two ends of each horizontal T-shaped slot in the driving ring to the axis of the driving ring is larger than or equal to the radial movement distance of the lock block from the lower joint when changing from the disengaged status to the engaged status.

7. The rotary lock block type drilling riser connector of claim 1, wherein a through hole and a via hole corresponding to at least one of a hydraulic pipeline, a kill pipeline, a mud pressurizing pipeline, a hydraulic pipeline and a choke pipeline are provided in the flange of the upper joint and the flange of the lower joint.

* * * * *